US008775716B1

(12) United States Patent
Cook et al.

(10) Patent No.: US 8,775,716 B1
(45) Date of Patent: Jul. 8, 2014

(54) METHODS AND SYSTEMS FOR DEFRAGMENTING VIRTUAL MACHINE PREFETCH DATA ON PHYSICAL STORAGE

(71) Applicants: Randall R. Cook, Springville, UT (US); Brian Hernacki, San Carlos, CA (US); Sourabh Satish, Fremont, CA (US); William E. Sobel, Jamul, CA (US)

(72) Inventors: Randall R. Cook, Springville, UT (US); Brian Hernacki, San Carlos, CA (US); Sourabh Satish, Fremont, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/671,788

(22) Filed: Nov. 8, 2012

Related U.S. Application Data

(63) Continuation of application No. 12/242,734, filed on Sep. 30, 2008, now Pat. No. 8,332,570.

(51) Int. Cl.
*G06F 3/06* (2006.01)
*G06F 9/455* (2006.01)

(52) U.S. Cl.
CPC ............ *G06F 3/0613* (2013.01); *G06F 3/0646* (2013.01); *G06F 3/0676* (2013.01); *G06F 2206/1004* (2013.01); *G06F 9/45558* (2013.01)
USPC .......... 711/6; 711/137; 711/165; 711/E12.004

(58) Field of Classification Search
None
See application file for complete search history.

(56) References Cited

U.S. PATENT DOCUMENTS

| 5,559,960 | A   * | 9/1996  | Lettvin ........................... 726/24 |
| 6,564,228 | B1  * | 5/2003  | O'Connor ............................. 1/1 |
| 6,963,959 | B2  * | 11/2005 | Hsu et al. ...................... 711/165 |
| 8,285,758 | B1  * | 10/2012 | Bono et al. .................... 707/822 |
| 8,332,570 | B1  * | 12/2012 | Cook et al. ......................... 711/6 |
| 2006/0101189 | A1 * | 5/2006  | Chandrasekaran et al. ...... 711/6 |
| 2007/0074226 | A1 * | 3/2007  | Zimmer et al. ............... 719/321 |
| 2007/0136551 | A1 * | 6/2007  | Leis et al. ..................... 711/173 |
| 2007/0180257 | A1 * | 8/2007  | Bae et al. ...................... 713/182 |
| 2008/0154985 | A1 * | 6/2008  | Childs et al. .................. 707/204 |
| 2008/0270706 | A1 * | 10/2008 | Fair et al. ..................... 711/137 |
| 2011/0154329 | A1 * | 6/2011  | Arcese et al. ..................... 718/1 |
| 2012/0117555 | A1 * | 5/2012  | Banerjee et al. ............. 717/168 |
| 2012/0151177 | A1 * | 6/2012  | Kalach et al. ................. 711/203 |
| 2013/0151805 | A1 * | 6/2013  | Fontignie et al. ............. 711/170 |

OTHER PUBLICATIONS

CX7-Solutions. "How to Add an Additional Disk to Your Linux VMWare Installation." Aug. 2007. http://www.cx7solutions.com/showmparttoc.php?artp=vmware,linux,workstation,add_disk.*
Ricky M. Magalhaes. "Installing and configuring virtual PC (Part 2)." Jul. 16, 2004. WindowsNetworking.com. http://www.windowsnetworking.com/articles_tutorials/Installing-Configuring-Virtual-PC-Part2.html.*
Seth. "Smart Defragging by Layout.ini for Free." Sep. 4, 2007. http://windowstipsandfixes.blogspot.com/2007/09/smart-defragging-by-layoutini.html.*
"mount." Sep. 1997. Linux Programmers Manual.*

* cited by examiner

*Primary Examiner* — Nathan Sadler
(74) *Attorney, Agent, or Firm* — ALG Intellectual Property, LLC

(57) ABSTRACT

A computer-implemented method for defragmenting virtual machine prefetch data. The method may include obtaining prefetch information associated with prefetch data of a virtual machine. The method may also include defragmenting, based on the prefetch information, the prefetch data on physical storage. The prefetch information may include a starting location and length of the prefetch data on a virtual disk. The prefetch information may include a geometry specification of the virtual disk. Defragmenting on physical storage may include placing the prefetch data contiguously on physical storage, placing the prefetch data in a fast-access segment of physical storage, and/or ordering the prefetch data according to the order in which it is accessed at system or application startup.

20 Claims, 6 Drawing Sheets

METHODS AND SYSTEMS FOR DEFRAGMENTING VIRTUAL MACHINE PREFETCH DATA ON PHYSICAL STORAGE

CROSS REFERENCE TO RELATED APPLICATION

This application is a continuation of U.S. Pat. No. 8,332,570 B1, filed 30 Sep. 2008 and issued on 11 Dec. 2012, the disclosure of which is incorporated, in its entirety.

BACKGROUND

Users may experience startup delays when a computing system or application starts up because of the data and software modules that the system or application must load from physical storage to memory. The data and code accessed during a system or application startup may be referred to as prefetch data. As computing systems and applications become larger and more complex, the size of prefetch data may grow and may cause startup delays to increase.

To reduce startup delays, some systems and applications may use prefetchers. For example, an operating system may use a prefetcher that monitors code and data accessed during a boot process. The prefetcher may store the information collected during the boot process in a trace file. Subsequent boots of the operating system may use the trace file to load code and data more efficiently. Similarly, applications may use prefetchers that monitor code and data accessed during application startup, and trace files created by an application prefetcher may be used to start the application more efficiently in the future.

Some prefetch technologies may attempt to improve boot or startup times by optimizing organization of prefetch data on physical storage. For example, a system may use a trace file to defragment prefetch data. Some systems and applications may also use trace files to physically organize prefetch data in the order in which it is accessed during startup. By optimizing organization of the prefetch data on physical storage, systems may decrease access time for the prefetch data, which may reduce startup delays.

Unfortunately, traditional prefetch technologies may not reduce startup delays in virtual machines. A virtual machine runs on a host machine. The host machine may interface with the virtual machine by providing the virtual machine with emulated hardware, such as a virtual disk. The host may implement a virtual disk as a file on the host's physical storage device, and the host may distribute this virtual disk file arbitrarily on the host's physical storage device. The virtual disk file may be stored in one part or in segments, contiguously or non-contiguously, ordered or unordered, with various segments of the virtual disk file on physically disparate portions of the host's physical storage device.

When a virtual machine employs a prefetch technology that optimizes prefetch data organization, prefetch data may be placed in optimal locations on the virtual disk. However, because the virtual disk file may be distributed arbitrarily across the host's physical storage device, optimally reorganizing prefetch data relative to the virtual disk results in arbitrary, rather than optimal, reorganization of the prefetch data on the host's physical storage device. Because the prefetch data is arbitrarily reorganized on the host's physical storage device, startup time may not decrease and could even increase.

SUMMARY

Embodiments of the instant disclosure are directed to decreasing system and application startup times on a virtual machine. Some embodiments may decrease startup time by defragmenting virtual machine prefetch data on a physical storage device. For example, a defragmenting module may defragment physical storage of a virtual machine by 1) obtaining prefetch information associated with prefetch data of the virtual machine and 2) defragmenting, based on the prefetch information, the prefetch data on a physical storage device.

Prefetch information may include any information that enables a defragmenting module to decrease system or application startup time by reorganizing the prefetch data on the physical storage device. In one example, prefetch information may include the starting location of the prefetch data on the virtual disk, the length of the prefetch data on the virtual disk, and/or a geometry specification that specifies how the virtual disk maps to the physical storage device. Prefetch information may also include a trace file created by monitoring a virtual machine's boot process.

As previously mentioned, one step in defragmenting physical storage of a virtual machine may be obtaining prefetch information for the virtual machine. A defragmenting module may obtain prefetch information by receiving the prefetch information from the virtual machine or by mounting and reading a file system of the virtual machine to identify prefetch information. For example, the defragmenting module may search a virtual machine for a trace file that identifies prefetch data of the virtual machine. In some embodiments, a defragmenting module may obtain prefetch information by monitoring data and code that the virtual machine or an application on the virtual machine accesses during startup.

After obtaining the prefetch information, the defragmenting module may use the prefetch information to defragment the prefetch data. The defragmenting module may defragment the prefetch data by placing the prefetch data on a fast-access segment of the physical storage device, by placing the prefetch data contiguously on the physical storage device, and/or by ordering the prefetch data on the physical storage device. In one example, the physical storage device may be a hard disk. The defragmenting module may defragment the prefetch data by placing the prefetch data contiguously on the outside of the hard disk and by ordering the prefetch data in the order in which the data is accessed at system or application startup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF DRAWINGS

The accompanying drawings illustrate a number of exemplary embodiments and are a part of the specification. Together with the following description, these drawings demonstrate and explain various principles of the instant disclosure.

Figure 1:
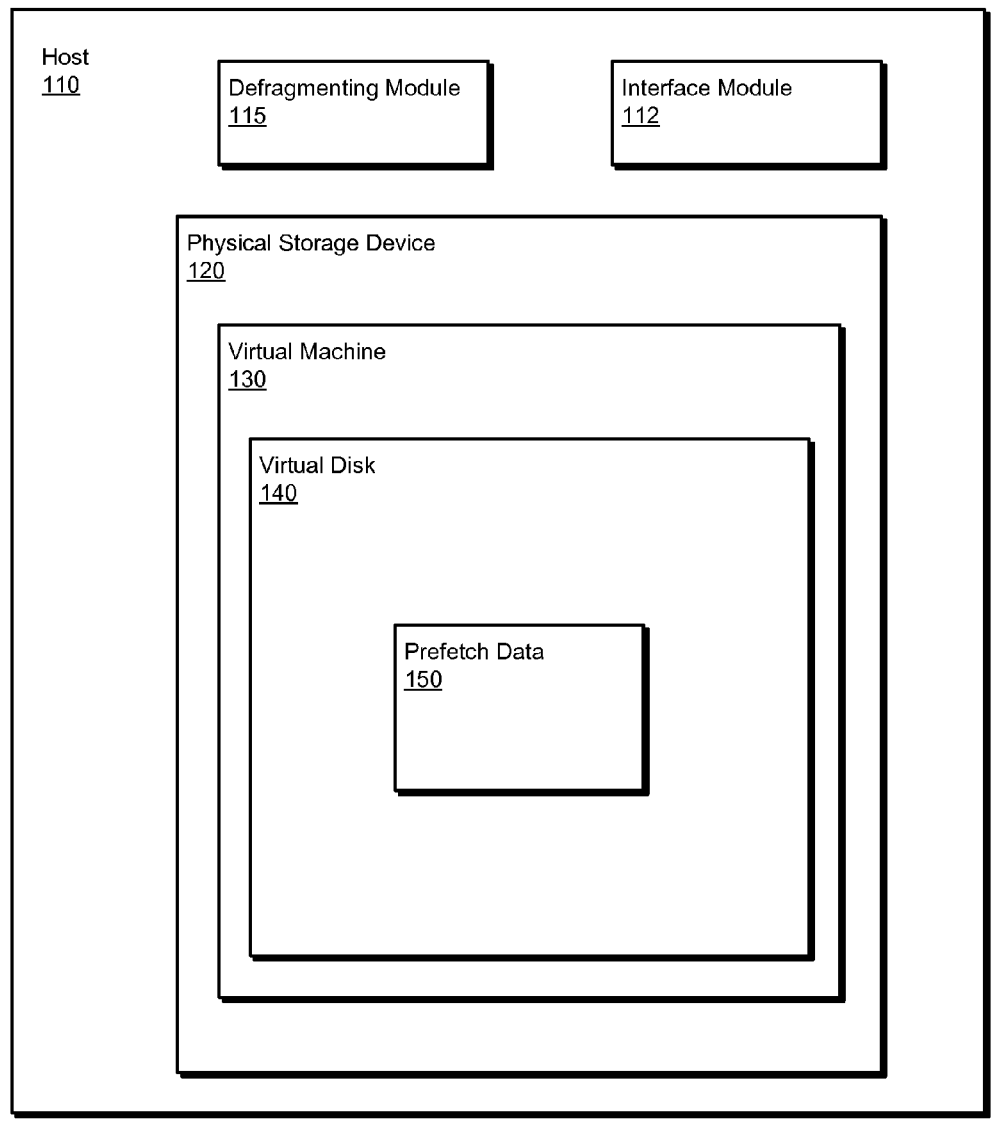
FIG. 1 is a block diagram of an exemplary system for defragmenting virtual machine prefetch data on physical storage according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for defragmenting virtual machine prefetch data on physical storage. As detailed below, in various embodiments a defragmenting module may defragment prefetch data on a physical storage device by placing the prefetch data in a fast-access location of the physical storage device, by organizing the prefetch data contiguously on the physical storage device, by ordering the prefetch data according to the sequence in which a system may retrieve the prefetch data, or by performing any combination of these or other techniques.

As used herein, the phrase "geometry specification" may refer to a mapping of data storage locations on a virtual storage device to data storage locations on a physical storage device. The physical storage device may host the virtual storage device. The term "contiguous," as used herein, may refer to storage on a physical storage device in contiguous physical locations. Physical locations may be contiguous if the physical storage device accesses the locations consecutively in its data retrieval. The term "contiguous" also refers to physical storage that is substantially or approximately contiguous.

FIG. 1 is a block diagram of an exemplary host 110. Host 110 may generally represent any type of computing device, such as a desktop computer, a laptop computer, a workstation, a personal digital assistant, a cellular telephone, or any other suitable computing device. Host 110 may comprise a defragmenting module 115, an interface module 112, and a physical storage device 120.

Defragmenting module 115 and interface module 112 may comprise any computer-executable code capable of performing one or more of the steps or functions disclosed herein. While FIG. 1 shows defragmenting module 115 on host 110, defragmenting module 115 may be stored on a network device remote from a host on which defragmenting module 115 performs defragmenting. Defragmenting module 115 and/or interface module 112 may comprise a set of modules for performing different functions, may be modules within a software application, or may comprise a software application. Physical storage device 120 may be any type of rewritable physical storage medium, such as a hard disk, flash memory, a compact disk, a DVD, a magnetic tape, or any other suitable physical storage medium.

Physical storage device 120 may store a virtual machine 130. Virtual machine 130 may comprise computer-executable instructions and data. Virtual machine 130 may include a virtual disk 140. Virtual disk 140 may store all computer-executable instructions and data that comprise virtual machine 130. Virtual machine 130 may generally represent software that communicates with hardware or other resources through a virtualization layer, such as a hypervisor. Virtual machine 130 may run an operating system such as WINDOWS, LINUX, SOLARIS, or any other suitable operating system.

Virtual disk 140 may include prefetch data 150. Prefetch data 150 may include any code or data that virtual machine 130 accesses during a system startup, an application startup, or any other code or data that may be used to accelerate application and/or operating system boot processes. For example, prefetch data 150 may include files or sub-sections of files that virtual machine 130 accesses during system startup. Such system-startup prefetch data may comprise startup files identified in the layout.ini file in MICROSOFT WINDOWS. In the layout.ini file, MICROSOFT WINDOWS identifies files that are accessed during system startup. In another example, prefetch data 150 may include files or sub-sections of files that an application accesses during application startup. Application-startup prefetch data may comprise .DLL (Dynamic Link Library) files that an application loads at startup.

Figure 2:
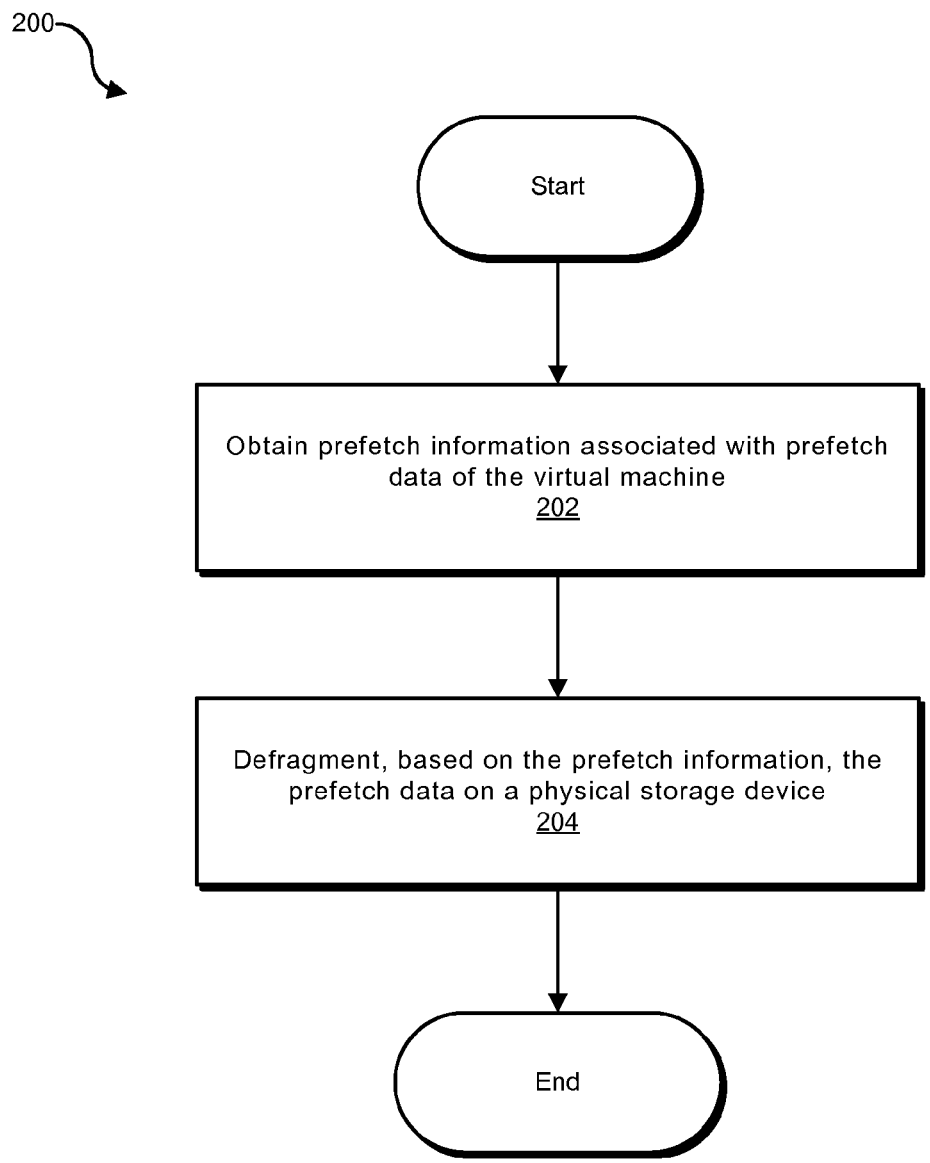
FIG. 2 is a flow diagram of an exemplary method for defragmenting virtual machine prefetch data on physical storage according to certain embodiments.

FIG. 2 is a flow diagram of an exemplary computer-implemented method 200 for defragmenting virtual machine prefetch data on physical storage. As illustrated in FIG. 2, a system may obtain prefetch information associated with prefetch data of a virtual machine (step 202) and defragment the prefetch data on a physical storage device (step 204). For example, referencing FIG. 1, defragmenting module 115 may obtain prefetch information associated with prefetch data 150 of virtual machine 130. Defragment module 115 may then defragment prefetch data 150 on physical storage device 120.

In some embodiments, prefetch data 150 may comprise files and sub-sections of files. For example, prefetch data 150 may comprise a sub-section of a large file. Only a portion of the large file may be accessed at system startup or application startup, and this portion may be referred to as prefetch data. As an illustrative example, virtual disk 140 may contain several applications. One of the applications may be a security software application that starts each time virtual disk 140 boots. Prefetch data 150 may contain data and code for starting up the security software application. Prefetch data 150 may not contain any data for other applications in virtual disk 140 that do not start when virtual disk 140 boots.

In one embodiment of step 202, obtaining prefetch information may comprise receiving the prefetch information from the virtual machine. For example, virtual machine 130 may send prefetch information to defragmentation module 115. Virtual machine 130 may package prefetch information as a prefetch-information file, such as a trace file, and may send the file to defragmentation module 115. A prefetch information file may identify data and/or code that is accessed when the virtual machine, or an application on the virtual machine, starts up.

Prefetch-information files may be sent to defragmentation module 115 over a virtual network, a physical network, and/or via an interface module such as interface module 112. In some embodiments, interface module 112 may be any code that facilitates communications between a defragmentation module and a virtual machine. Virtual machine 130 may prepare and/or send prefetch information to defragmentation module 115 in response to a request from defragmentation module 115, at agreed-upon time intervals, and/or according to any other suitable scheduling technique.

In some embodiments, obtaining prefetch information associated with prefetch data of a virtual machine may include mounting a virtual disk of the virtual machine and reading a virtual disk file system associated with the virtual disk. For example, defragmentation module 115 may mount virtual disk 140 of virtual machine 130. Mounting a virtual disk of a virtual machine may include identifying the location of the virtual disk in the physical storage device, identifying the file system type of the virtual disk, identifying a file system interface for the identified file system type, and/or employing the file system interface to access data in the virtual disk file system. After mounting the virtual disk, defragmentation module 115 may read the virtual disk file system to identify prefetch information. For example, defragmentation module 115 may search for a prefetch trace file (e.g., a file that identifies code and/or data accessed during startup) stored on virtual machine 130.

In some embodiments, defragmentation module 115 may identify where virtual disk 140 is located in physical storage device 120 by querying interface module 112. When defragmentation module 115 queries interface module 112, interface module 112 may respond with the location of virtual disk 140 on physical storage device 120. Interface module 112 may be a virtualization platform that provides an interface between virtual machine 130 and host 110. A hypervisor is an example of a virtualization platform. Interface module 112 may be a type 1 or a type 2 hypervisor. A type 1 hypervisor may also be referred to as a native hypervisor and may run directly on a hardware platform (e.g., directly on the hardware on host 110). A type 2 hypervisor may also be referred to as a hosted hypervisor and may run within an operating system environment.

After identifying a location of virtual disk 140 on physical storage device 120, defragmentation module 115 may identify the file system type of virtual disk 140 by accessing an indicator at the beginning of the virtual disk or by retrieving the file system type from any other known storage location. The file system of virtual disk 140 may be any type of file system, such as DOS, FAT, NTFS, NFS, UNIX-based, or any other system for organizing data on a physical storage device.

Next, defragmentation module 115 may identify a file system interface for the identified file system type by searching a repository of file system interfaces or by retrieving an already-obtained file system interface for the identified file system type. For example, defragmentation module 115, having identified an NTFS file system, may query a repository for an NTFS interface that would allow defragmentation module 115 to read the virtual disk file system. In an alternate embodiment, defragmentation module 115 may retrieve a stored file system interface to enable access to the file system.

Using the file system interface, defragmentation module 115 may read the data of the virtual disk file system. When reading the virtual disk file system, defragmentation module 115 may identify a starting location of prefetch data 150 on virtual disk 140, identify a length of prefetch data 150, and/or identify a geometry specification of virtual disk 140. For example, defragmentation module 115 may retrieve, from a known location on virtual disk 140, a prefetch information file. The prefetch information file may specify a starting location of prefetch data 150 on virtual disk 140, a length of prefetch data 150, and/or a geometry specification of virtual disk 140.

In an alternative embodiment, reading a virtual disk file system to identify the prefetch information may include accessing contents of a layout file (e.g., a layout.ini file) to identify the prefetch data and a prefetch-data-access order, identify storage locations and lengths of files and file sub-sections on the virtual disk of the virtual machine, and/or identify a geometry specification of the virtual disk of the virtual machine. For example, virtual machine 130 may run a WINDOWS operating system, and defragmentation module 115 may retrieve a layout.ini file in virtual machine 130. The layout.ini file may comprise a list of prefetch data 150 and the order in which prefetch data 150 is accessed during system startup. By reading the virtual disk file system, defragmentation module 115 may determine storage locations and lengths on virtual disk 140 of all segments of prefetch data 150. Defragmentation module 115 may then identify a geometry specification of virtual disk 140. The geometry specification may be obtained from virtualization platform, such as a hypervisor. Using the layout.ini file, data locations and lengths of the prefetch data, and the geometry specification of the virtual disk, defragmentation module 115 may identify and retrieve prefetch data 150 from virtual disk 140.

Prefetch information may comprise any information that enables a system to identify and retrieve prefetch data. Prefetch information may comprise at least one of the following pieces of information: 1) a starting location of the prefetch data in a virtual disk of the virtual machine; 2) a length of the prefetch data; 3) a geometry specification of the virtual disk of the virtual machine; 4) a listing of files and file sub-sections that comprise the prefetch data; 5) a prefetch-data-access order; and/or 6) storage locations and lengths of files and file sub-sections on the virtual disk of the virtual machine. In at least one embodiment, prefetch information may comprise a starting location of prefetch data 150 in virtual disk 140, a length of prefetch data 150, and a geometry specification of virtual disk 140. These three pieces of information may be sufficient to enable defragmentation module 115 to retrieve prefetch data 150 when prefetch data 150 is stored contiguously on virtual disk 140.

In an alternate embodiment, prefetch information may comprise a listing of files and file sub-sections that comprise prefetch data 150, storage locations and lengths of files and file sub-sections of prefetch data on virtual disk 140, and a geometry specification of virtual disk 140. These three pieces of information may be sufficient to enable defragmentation module 115 to retrieve prefetch data 150 when prefetch data 150 is stored in scattered locations on virtual disk 140. In some embodiments, defragmentation module 115 may use a trace file to identify prefetch data in scattered locations on a virtual disk.

In some embodiments, prefetch information may comprise a prefetch-data-access order. The prefetch-data-access order may specify the order in which the system accesses prefetch data at system startup, application startup, or in any other prefetch context. The system may defragment the prefetch data according to the prefetch-data-access order so that the prefetch data is ordered in physical storage according to its prefetch access order. For example, virtual machine 130 may access data segments B, C, and A, in that order, at system startup. Prefetch-data-access order may specify the order B-C-A, allowing defragmentation module 115 to order prefetch data 150 when defragmentation module 115 defragments prefetch data 150.

While specific examples of prefetch information have been discussed herein, embodiments of the present disclosure may be implemented using any suitable type of prefetch information. Generally, prefetch information may be any type of information that may enable defragmentation module 115 to retrieve and/or defragment prefetch data 150.

Returning to FIG. 2, defragmentation module 115 may defragment, based on the prefetch information, the prefetch data on a physical storage device (step 204). In other words, defragmentation module 115 may defragment the prefetch data by using the prefetch information. For example, defragmentation module 115 may defragment prefetch data 150 on physical storage device 120 by using, implementing, and/or analyzing previously obtained prefetch information.

In some embodiments, defragmenting prefetch data may include placing the prefetch data in a region of the physical storage device such that access time for defragmented prefetch data is less than access time for the prefetch data before the prefetch data was defragmented. For example, defragmentation module 115 may place prefetch data 150 on a segment of physical storage device 120 for which access is faster than the segment on physical storage device 120 where prefetch data 150 was located before defragmenting.

In various embodiments, a physical storage device may comprise a hard disk with a circular platter that stores data. Because the outside of the platter is longer and moves faster than the inside when the hard disk is spinning, accessing data on the outside of the platter may be faster that accessing data on the inside of the platter. Thus, to decrease startup time, prefetch data may be placed toward the outside of a hard disk platter.

Figure 3:
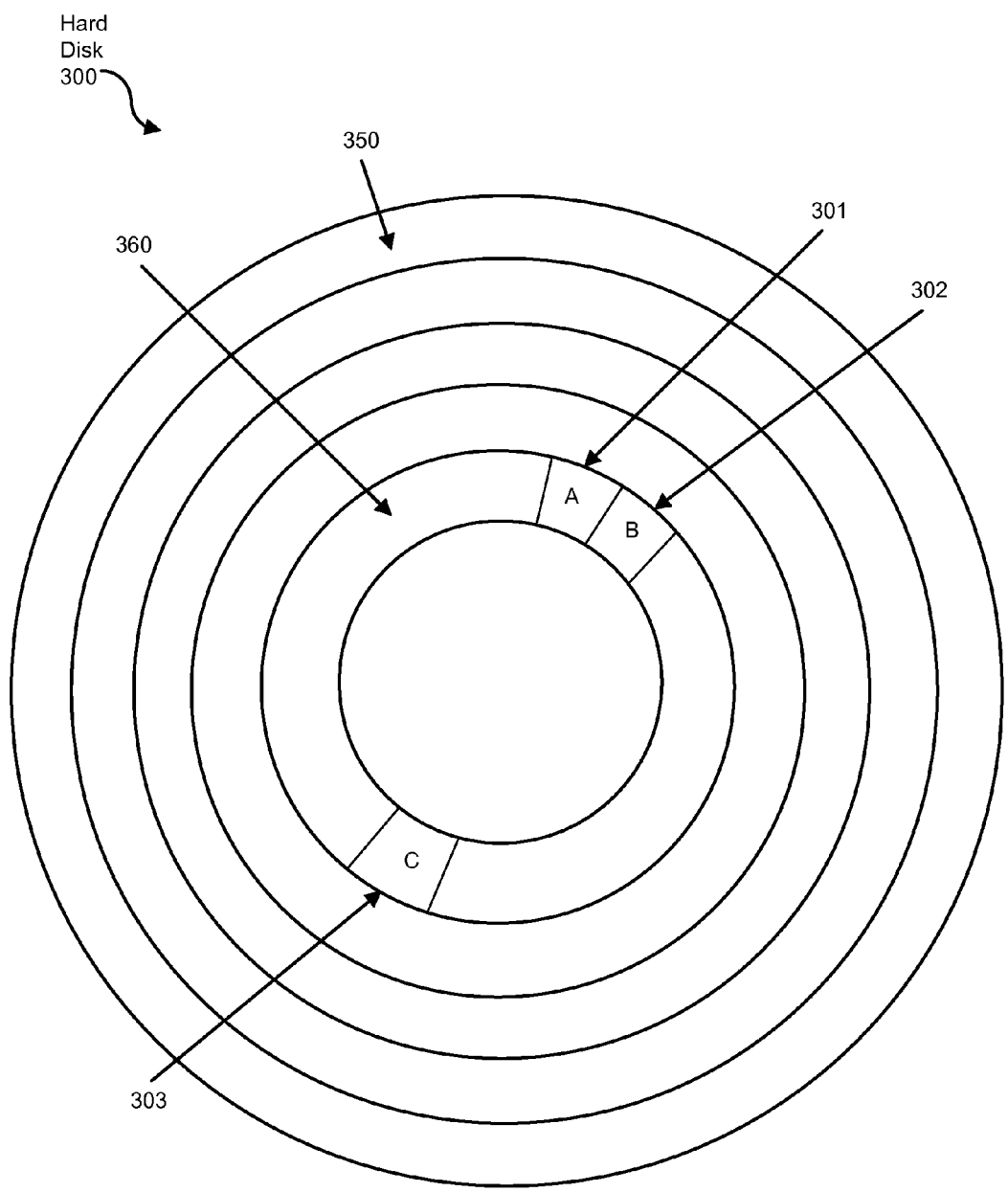
FIG. 3 is a block diagram of an exemplary physical storage device according the certain embodiments.
Figure 4:
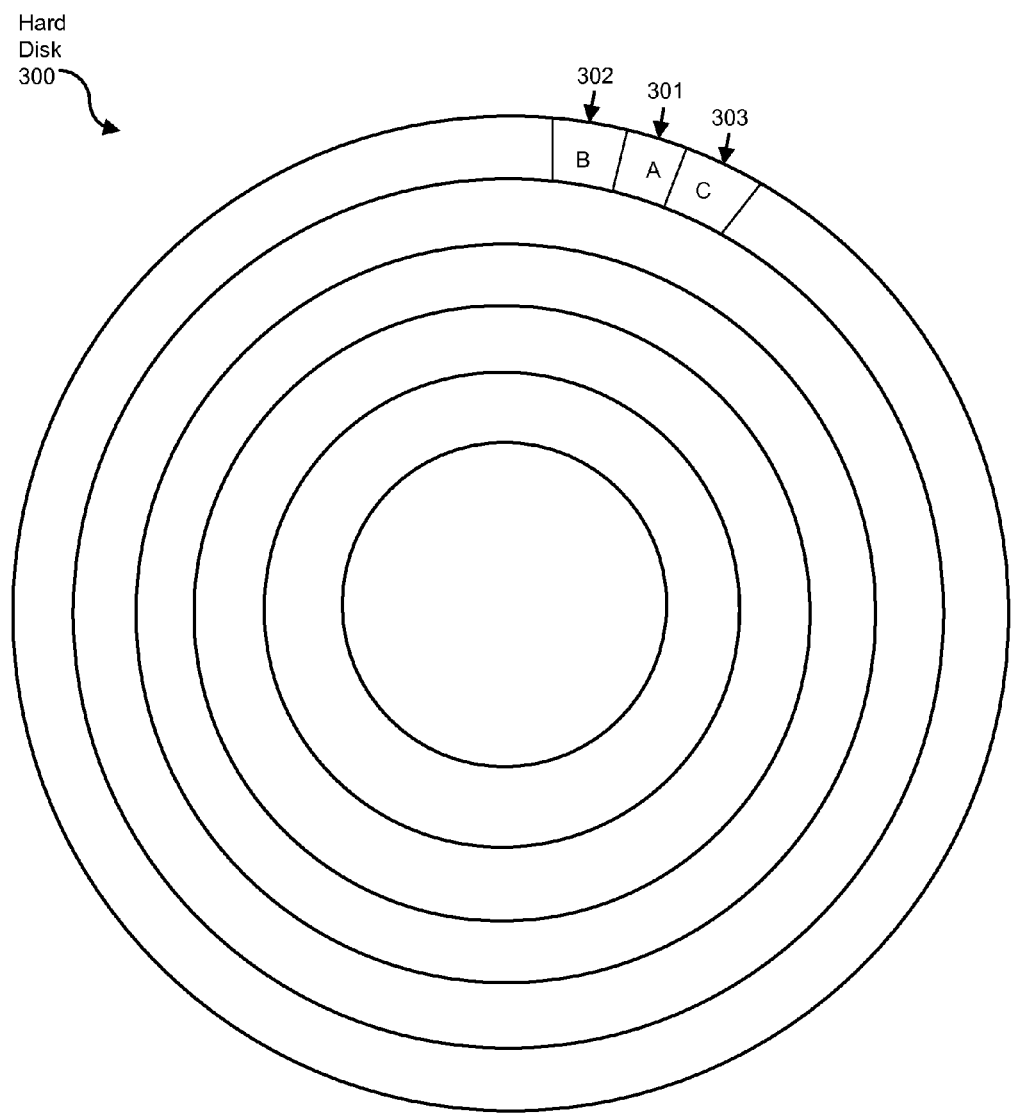
FIG. 4 is another block diagram of the exemplary physical storage device shown in FIG. 3.

FIG. 3 is a block diagram of a hard disk 300. Hard disk 300 has an outermost track 350 and an innermost track 360. As part of defragmenting, defragmentation module 115 may place prefetch data 150 on segments of hard disk 300 that are further from the center of the platter than the segments of hard disk 300 where prefetch data 150 was stored before defragmenting. In alternative embodiments, physical storage device 120 may also comprise a solid state drive or any other suitable physical storage device. FIG. 3 shows a hard disk 300 with three prefetch data segments 301, 302, and 303 located on the inside of hard disk 300. FIG. 4 illustrates an exemplary defragmented hard disk 300 in which data segments 301, 302, and 303 have been placed on the outside of hard disk 300.

In some embodiments, defragmenting may comprise placing the prefetch data in a substantially contiguous location on the hard disk. For example, defragmentation module 115 may defragment prefetch data 150 by placing prefetch data 150 contiguously on hard disk 300. FIG. 3 shows a hard disk 300 with three prefetch data segments 301, 302, 303 located non-contiguously on hard disk 300. FIG. 3 shows that data segments 301, 302, and 303 have been placed contiguously on hard disk 300.

In another embodiment, defragmenting may comprise ordering the prefetch data in accordance with a prefetch-data-access order specified in the prefetch information. For example, to defragment prefetch data 150, defragmentation module 115 may order prefetch data 150 on hard disk 300 according to a prefetch-data-access order. Prefetch data 150 may comprise three data segments, A, B, and C. The prefetch-data-access order may specify the order B-A-C. Defragmentation module 115 may defragment prefetch data 150 by placing data segments A, B, and C in the order B, A, C on hard disk 300. FIG. 3 shows a hard disk 300 with three prefetch data segments 301, 302, 303 on hard disk 300. Assuming a prefetch-data-access order B-A-C, FIG. 4 illustrates an exemplary defragmented hard disk 300 in which data segments 301, 302, and 303 have been ordered according to the prefetch-data-access order.

The systems and methods disclosed herein may be implemented in a variety of ways and provide a number of advantages over the prior art. For example, defragmenting virtual machine prefetch data on a physical storage device may decrease system and application startup delays. Embodiments of the instant disclosure may decrease startup delays by optimizing the organization of virtual machine prefetch data on the physical storage device hosting the virtual machine. For example, the system may decrease startup delays by moving prefetch data from the slow-access inner tracks of a hard disk to the fast-access outer tracks of a hard disk, thereby increasing the ability to quickly and efficiently access prefetch data for virtual machines.

Figure 5:
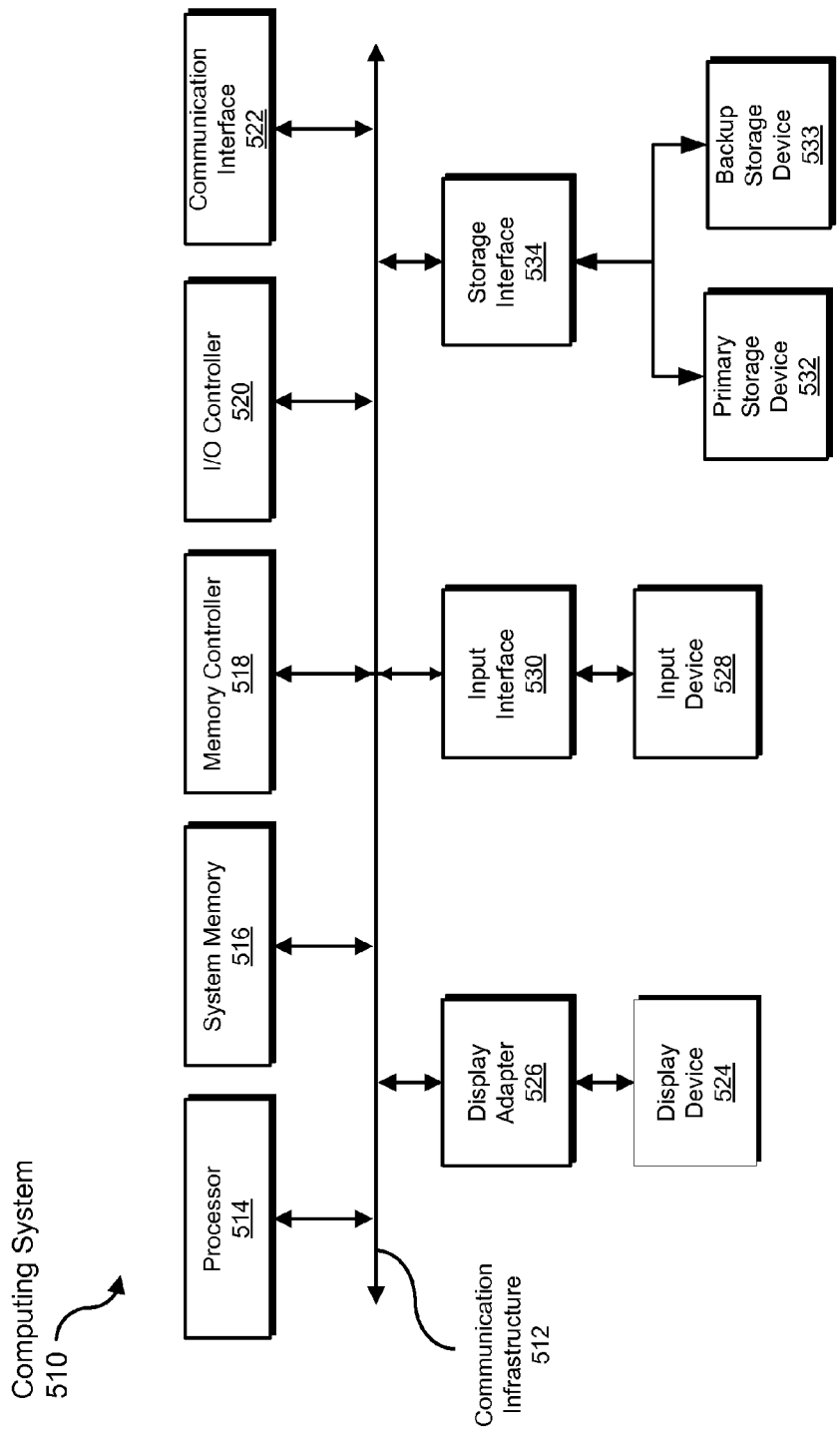
FIG. 5 is a block diagram of an exemplary computing system capable of implementing one or more of the embodiments described and/or illustrated herein.

FIG. 5 is a block diagram of an exemplary computing system 500 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the defragmenting, obtaining, receiving, mounting, reading, identifying, accessing, placing, and ordering steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as defragmenting, obtaining, receiving, mounting, reading, identifying, accessing, placing, and/or ordering.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the defragmenting, obtaining, receiving, mounting, reading, identifying, accessing, placing, and ordering steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the defragmenting, obtaining, receiving, mounting, reading, identifying, accessing, placing, and ordering steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526.

Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the defragmenting, obtaining, receiving, mounting, reading, identifying, accessing, placing, and ordering steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the defragmenting, obtaining, receiving, mounting, reading, identifying, accessing, placing, and ordering steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
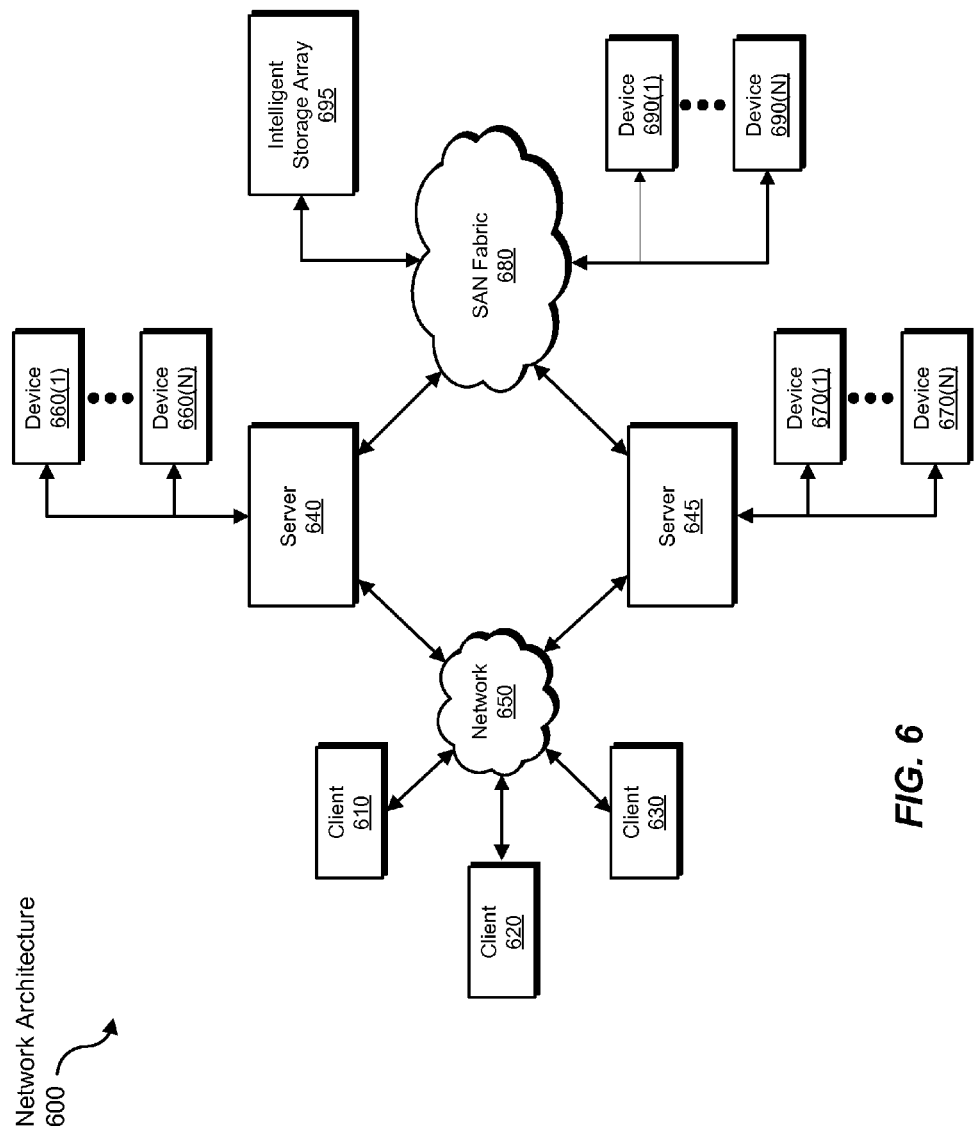
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 6. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the defragmenting, obtaining, receiving, mounting, reading, identifying, accessing, placing, and ordering steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for defragmenting virtual machine prefetch data on physical storage. For example, the method may comprise obtaining prefetch information associated with prefetch data of the virtual machine, and defragmenting, based on the prefetch information, the prefetch data on a physical storage device.

The prefetch data may comprise data accessed during a system startup. Alternatively, the prefetch data may comprise data accessed during an application startup. The prefetch data may comprise files, sub-sections of files, or a combination of files and sub-sections of files. Obtaining the prefetch information may comprise receiving the information from the virtual machine. Alternatively, obtaining the prefetch information may comprise mounting a virtual disk of the virtual machine and reading the associated virtual disk file system.

In one example, reading the associated virtual disk file system may comprise: 1) identifying a starting location of the prefetch data in a virtual disk of the virtual machine, 2) identifying a length of the prefetch data, and/or 3) identifying a geometry specification of the virtual disk of the virtual machine. In an alternative example, reading the associated virtual disk file system may comprise 1) accessing contents of a layout file, such as a layout.ini file, to identify the prefetch data and a prefetch-data-access order; 2) identifying storage locations and lengths of files and file sub-sections on the virtual disk of the virtual machine, and/or 3) identifying a geometry specification of the virtual disk of the virtual machine.

The prefetch information may comprise at least one of: 1) a starting location of the prefetch data in a virtual disk of the virtual machine; 2) a length of the prefetch data; 3) a geometry specification of the virtual disk of the virtual machine; 4) a listing of files and file sub-sections that comprise the prefetch data; 5) a prefetch-data-access order; and/or 6) storage locations and lengths of files and file sub-sections on the virtual disk of the virtual machine.

Defragmenting the prefetch data on physical storage may comprise placing the prefetch data in a region of the physical storage device such that access time for defragmented prefetch data is less than access time for the prefetch data before defragmenting. In one alternative, the physical storage device may comprise a hard disk, and defragmenting may comprise placing the prefetch data on the outside of the hard disk. In another alternative, the physical storage device may comprise a hard disk, and defragmenting may comprise ordering the prefetch data in accordance with a prefetch-data-access order specified in the prefetch information.

In addition, a computer-readable medium may comprise one or more computer-executable instructions that, when executed by a computing device, cause the computing device to obtain prefetch information associated with prefetch data of the virtual machine and defragment, based on the prefetch information, the prefetch data on a physical storage device. The prefetch data may comprise data accessed during a system startup. Alternatively, the prefetch data may comprise data accessed during an application startup. The prefetch data may comprise files, sub-sections of files, or a combination of files and sub-sections of files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for defragmenting physical storage of a virtual machine, comprising:
    identifying a physical storage device, wherein the physical storage device hosts the virtual machine;
    obtaining prefetch information associated with prefetch data accessed by the virtual machine during a startup of at least one of the virtual machine or an application on the virtual machine, wherein:
        the virtual machine comprises a virtual disk;
        the prefetch information comprises a prefetch-data-access order;
        obtaining the prefetch information comprises mounting, by a defragmentation module, the virtual disk of the virtual machine and reading a virtual disk file system of the virtual disk;
    identifying, within the prefetch information, a geometry specification of the virtual disk that maps storage locations of the virtual disk to storage locations on the physical storage device that hosts the virtual machine;
    decreasing a startup time of the startup of at least one of the virtual machine or the application on the virtual machine by defragmenting, based on the prefetch information, the prefetch data on the physical storage device, wherein the defragmenting comprises:
        using the geometry specification of the virtual disk to identify the prefetch data on the virtual disk;
        retrieving the prefetch data;
        moving at least a portion of the prefetch data from one location on the physical storage device to another location on the physical storage device according to the prefetch-data-access order such that access time during the startup of at least one of the virtual machine or the application on the virtual machine for defragmented prefetch data is less than access time during the startup of at least one of the virtual machine or the application on the virtual machine for the prefetch data before defragmenting.

2. The computer-implemented method of claim 1, wherein:
    the prefetch data, before being defragmented, is stored contiguously on the virtual disk;
    the prefetch information comprises a starting location of the prefetch data on the virtual disk;
    the prefetch information comprises a length of the prefetch data;
    the starting location of the prefetch data, the geometry specification, and the length of the prefetch data are sufficient to enable physical defragmentation of the prefetch data since the prefetch data is stored contiguously on the virtual disk.

3. The computer-implemented method of claim 1, wherein:
    the prefetch information comprises a prefetch trace file that comprises information collected while monitoring data accessed during the startup of at least one of the virtual machine or the application on the virtual machine;

the data accessed during the startup of at least one of the virtual machine or the application on the virtual machine comprises the prefetch data.

4. The computer-implemented method of claim 1, wherein:
the prefetch data, before being physically defragmented, is stored in scattered locations on the virtual disk;
the prefetch information comprises a listing of files and file sub-sections that comprise the prefetch data;
the prefetch information identifies storage locations and lengths of the files and the file sub-sections on the virtual disk;
the geometry specification, the listing of files and the file subsections, and the storage locations and the lengths of the files and the file subsections are sufficient to enable physical defragmentation of the prefetch data since the prefetch data is stored in scattered locations on the virtual disk.

5. The computer-implemented method of claim 1, wherein reading the virtual disk file system comprises:
identifying a starting location of the prefetch data in the virtual disk of the virtual machine;
identifying a length of the prefetch data;
identifying the geometry specification of the virtual disk of the virtual machine.

6. The computer-implemented method of claim 1, wherein the reading, by the physical storage device, of the virtual disk file system comprises:
accessing contents of a layout file to identify the prefetch data and the prefetch-data-access order;
identifying storage locations and lengths of files and file sub-sections on the virtual disk of the virtual machine, the files and the file sub-sections comprising the prefetch data;
identifying the geometry specification of the virtual disk of the virtual machine.

7. The computer-implemented method of claim 1, wherein the prefetch information associated with prefetch data accessed during the startup of at least one of the virtual machine or an application on the virtual machine comprises data accessed by a security software application during a security software application startup, wherein the security software application starts up each time the virtual disk boots.

8. The computer-implemented method of claim 1, further comprising identifying the prefetch data by using a layout file to identify files that are accessed during the startup of at least one of the virtual machine or the application on the virtual machine.

9. The computer-implemented method of claim 1, wherein mounting the virtual disk of the virtual machine comprises identifying a location of the virtual disk in the physical storage device.

10. The computer-implemented method of claim 9, wherein, after the location of the virtual disk in the physical storage device is identified, the virtual disk file system of the virtual disk is read by:
identifying a file system type of the virtual disk;
identifying a file system interface for the file system type of the virtual disk;
using the file system interface to enable reading of the prefetch data from the virtual disk.

11. The computer-implemented method of claim 10, wherein reading the prefetch data from the virtual disk comprises identifying a starting location of the prefetch data on the virtual disk and identifying a length of the prefetch data.

12. The computer-implemented method of claim 10, wherein identifying the file system type of the virtual disk comprises accessing an indicator at the beginning of the virtual disk.

13. The computer-implemented method of claim 10, wherein identifying the file system interface comprises searching a repository of file system interfaces for an interface for the file system type of the virtual disk.

14. A computer-implemented method for defragmenting physical storage of a virtual machine, comprising:
identifying a physical storage device, wherein the physical storage device hosts the virtual machine;
obtaining prefetch information associated with prefetch data accessed by the virtual machine, wherein:
the virtual machine comprises a virtual disk,
obtaining the prefetch information comprises mounting, by a defragmentation module, the virtual disk of the virtual machine and reading a virtual disk file system of the virtual disk,
the prefetch data comprises data accessed by the virtual machine during a startup of at least one of the virtual machine or an application on the virtual machine,
the prefetch information comprises a starting location of the prefetch data in the virtual disk of the virtual machine, a length of the prefetch data, a prefetch-data-access order, and a geometry specification of the virtual disk of the virtual machine;
using the geometry specification of the virtual disk to identify the prefetch data on the virtual disk;
decreasing a startup time of the startup of at least one of the virtual machine or the application on the virtual machine by defragmenting the prefetch data on the physical storage device, wherein defragmenting comprises ordering the prefetch data on the physical storage device in accordance with the prefetch-data-access order specified in the prefetch information.

15. The computer-implemented method of claim 14, wherein:
the prefetch-data-access order comprises an order in which the prefetch data is accessed during the startup of at least one of the virtual machine or the application on the virtual machine;
ordering the prefetch data on the physical storage device in accordance with the prefetch-data-access order specified in the prefetch information comprises ordering the prefetch data such that the data is organized in accordance with the order in which the prefetch data is accessed during the startup of at least one of the virtual machine or the application on the virtual machine.

16. A non-transitory computer-readable medium having thereon computer-executable instructions that, when executed by one or more processors of a computing system, cause the computing system to:
identify a physical storage device, wherein the physical storage device hosts the virtual machine;
obtain prefetch information associated with prefetch data accessed by the virtual machine during a startup of at least one of the virtual machine or an application on the virtual machine, wherein:
the virtual machine comprises a virtual disk;
the prefetch information comprises a prefetch-data-access order;
obtaining the prefetch information comprises mounting, by a defragmentation module, the virtual disk of the virtual machine and reading a virtual disk file system of the virtual disk;

identify data accessed during the startup of at least one of the virtual machine or the application on the virtual machine, wherein the prefetch data comprises the data accessed during the startup of at least one of the virtual machine or the application on the virtual machine;

decrease a startup time of the startup of at least one of the virtual machine or the application on the virtual machine by defragmenting, based on the prefetch information, the prefetch data on the physical storage device, wherein defragmenting comprises ordering the prefetch data on the physical storage device in accordance with the prefetch-data-access order specified in the prefetch information.

17. The non-transitory computer-readable medium of claim 16, wherein:

the physical storage device comprises a hard disk;

the computer-executable instructions further cause the computing system to place the prefetch data in a substantially contiguous location on the hard disk and place the prefetch data toward an outside of the hard disk;

the prefetch-data-access order identifies an order in which data and the code of a security software application are accessed during the startup of the security software application.

18. The non-transitory computer-readable medium of claim 16, wherein mounting the virtual disk of the virtual machine comprises identifying a location of the virtual disk in the physical storage device.

19. The non-transitory computer-readable medium of claim 18, wherein, after the location of the virtual disk in the physical storage device is identified, the virtual disk file system of the virtual disk is read by:

identifying a file system type of the virtual disk;

identifying a file system interface for the file system type of the virtual disk;

using the file system interface to enable reading of the prefetch data from the virtual disk.

20. The non-transitory computer-readable medium of claim 19, wherein reading the prefetch data from the virtual disk comprises identifying a starting location of the prefetch data on the virtual disk and identifying a length of the prefetch data.

* * * * *